Figure 9:
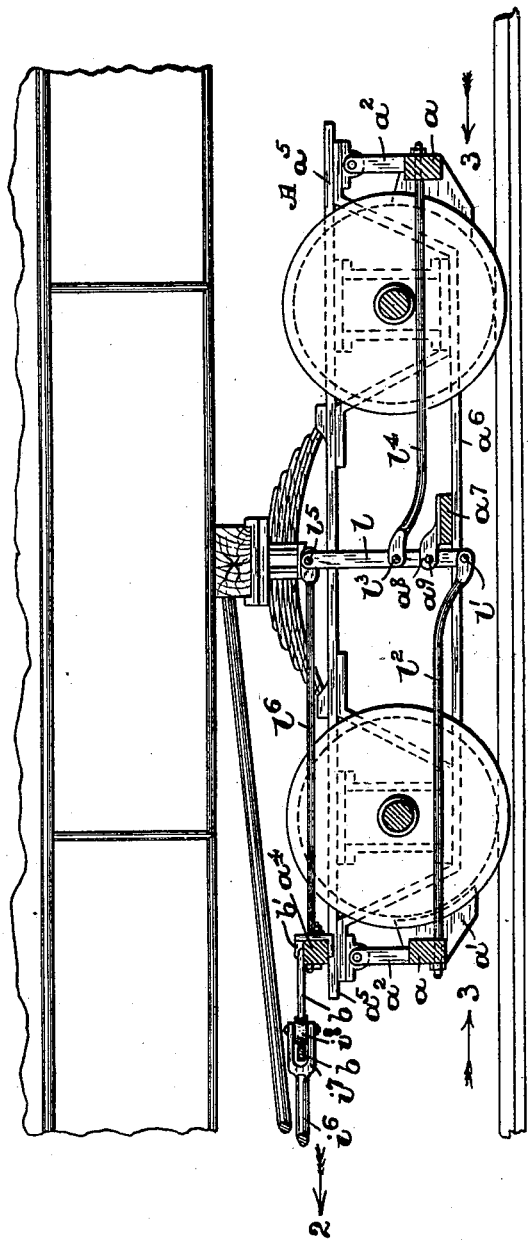

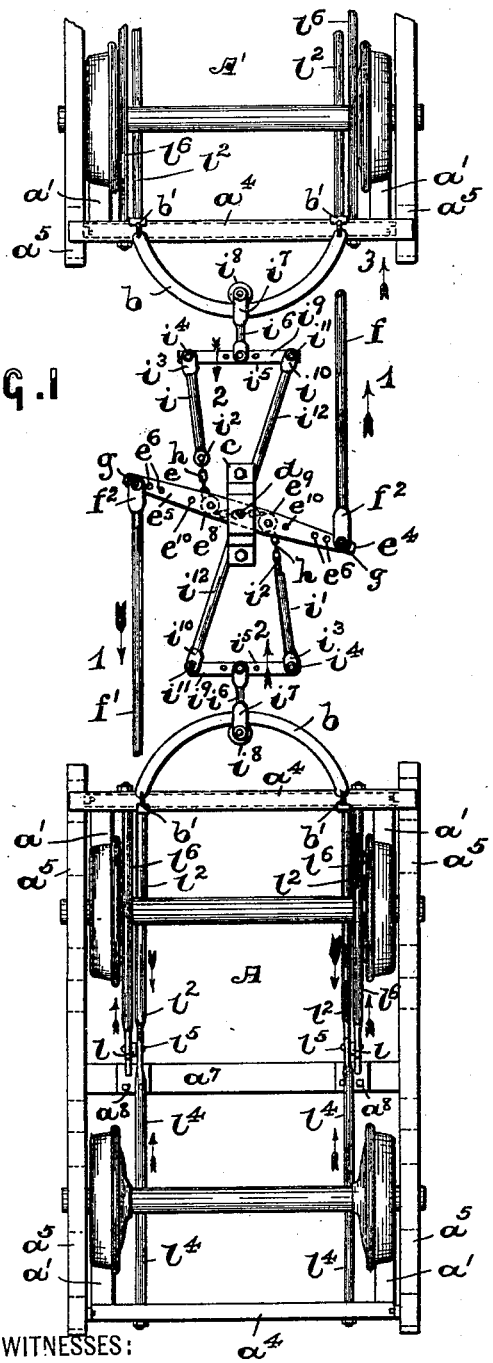

No. 666,562. Patented Jan. 22, 1901.
M. Q. RUTAN.
BRAKE MECHANISM.
(Application filed June 2, 1900.)
(No Model.) 3 Sheets—Sheet 2.
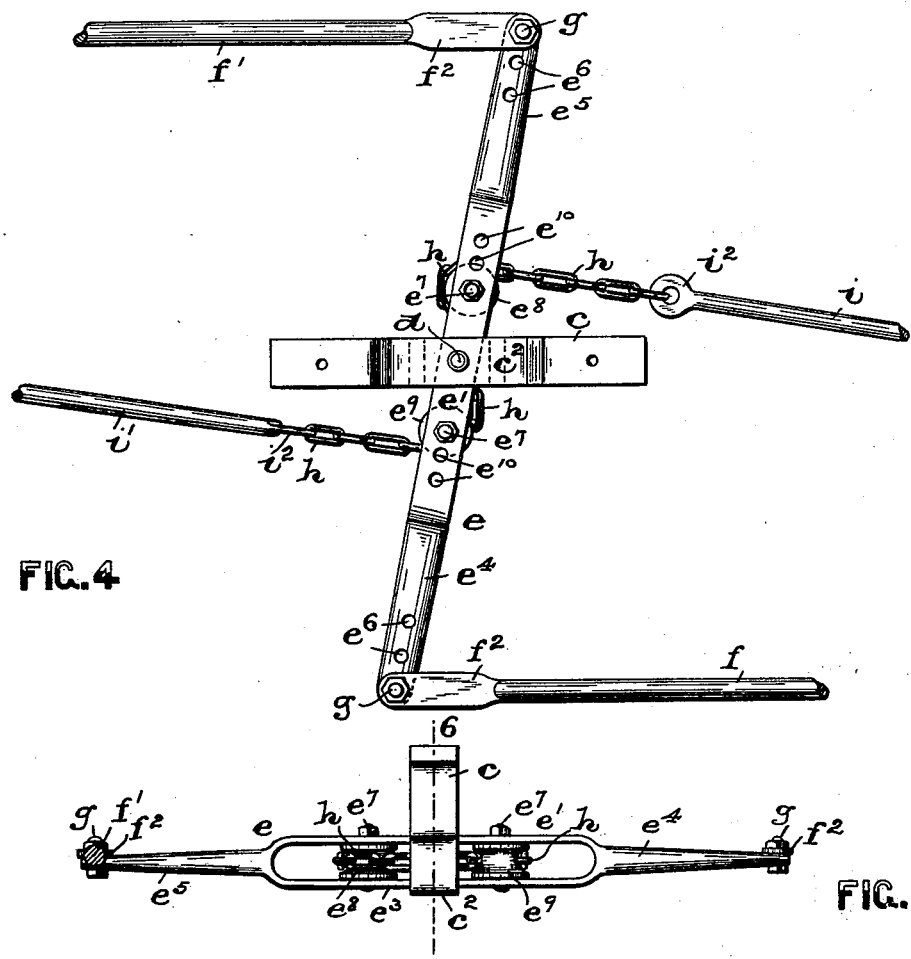
FIG. 4
FIG. 5
FIG. 6
FIG. 8
FIG. 7
WITNESSES:
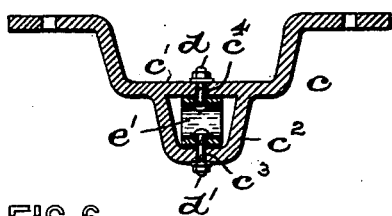
INVENTOR:
MICHAEL Q. RUTAN
BY
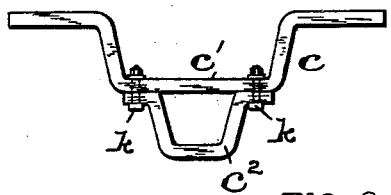
ATTORNEY
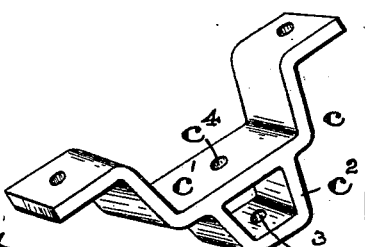
THE NORRIS PETERS CO., PHOTO-LITHO., WASHINGTON, D. C.

No. 666,562.

Patented Jan. 22, 1901.

M. Q. RUTAN.
BRAKE MECHANISM.
(Application filed June 2, 1900.)

(No Model.)

3 Sheets—Sheet 3.

WITNESSES:
Geo. D. Richards
John G. ?

INVENTOR:
MICHAEL Q. RUTAN
BY
Fred'k C. Fraentzel,
ATTORNEY

UNITED STATES PATENT OFFICE.

MICHAEL Q. RUTAN, OF EAST ORANGE, NEW JERSEY, ASSIGNOR TO HIRAM C. LORD, OF NEW YORK, N. Y.

BRAKE MECHANISM.

SPECIFICATION forming part of Letters Patent No. 666,562, dated January 22, 1901.

Application filed June 2, 1900. Serial No. 18,823. (No model.)

*To all whom it may concern:*

Be it known that I, MICHAEL Q. RUTAN, a citizen of the United States, residing at East Orange, in the county of Essex and State of New Jersey, have invented certain new and useful Improvements in Brake Mechanism; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has reference to improvements in the connecting and actuating mechanism for operating the brake-shoes of street and other railway cars; and the invention has for its primary object to provide a simple, strong, and efficient mechanism for actuating the brake-shoe-operating mechanism connected with the trucks of railway-cars and causing the brake-shoes thereof to act with equal pressure against the several wheels of the truck or trucks underneath the body of a car, irrespective of the wear on each brake-shoe, and thereby bringing the car to an easier standstill and preventing what is known as "flat" wheels.

In the usual construction of brake-shoe-operating mechanism rods forming rigid connections are employed for bringing the brake-shoes firmly against the surfaces of the wheels of a truck or trucks; but these constructions have this disadvantage: that when the several brake-shoes have become unevenly worn when the mechanism is operated but one set of brake-shoes will firmly and properly "brake" with the wheels with which they are to be engaged, while the other set of brake-shoes cannot be brought close enough to the surfaces of the respective wheels with which they are to brake, thereby resulting in a loss of power and sliding of the wheels upon the track and necessitating great expense in taking up or adjusting the several parts of the brake mechanism to cause all the brake-shoes to properly brake or grip all the wheels of the truck or trucks connected with the car-body. To overcome these objectionable features, I have devised a novel brake-shoe-adjusting mechanism to be placed in and connected with the brake-bars at the ends of a truck or trucks, which acts as an equalizing means to produce an equal gripping-pressure of each brake-shoe upon the respective peripheral surfaces of the wheels with which the several brake-shoes are to be brought in "braking" engagement.

A further object of this invention is to provide a brake mechanism of the character and for the purposes to be hereinafter fully specified which shall be free from complications and shall be positive and effective in its operations.

My novel mechanism may be used with any construction of brake-shoe-operating mechanism and may be applied to four-wheeled trucks of any design and is intended for use more especially on trucks for electric and cable cars.

My invention therefore consists in the brake mechanism hereinafter set forth, as well as in the novel construction of pressure-equalizing device to be fully described in the accompanying specification, and finally embodied in the clauses of the claim.

The invention is fully illustrated in the accompanying drawings, in which—

Figure 1 is a plan view of one form of double arrangement of car-trucks and a brake mechanism provided with an equalizing device embodying the principles of my present invention. Figs. 2 and 3 are similar views of equalizing devices of slightly-modified forms of construction, but still embodying the principal features of my invention, said equalizing devices being represented with certain portions of the brake-shoe-operating rods of any of the well-known forms of railway-trucks. Fig. 4 is a plan view of the equalizing device on an enlarged scale, and Fig. 5 is an end view of the same. Fig. 6 is a vertical cross-section taken on line 6 6 in said Fig. 5, illustrating more particularly one form of supporting-bracket and a cross-bar pivotally connected therewith, other parts of the mechanism being omitted; and Fig. 7 is a perspective view of the form of bracket represented in connection with the said above-described figures to be secured directly to the body of a car and with which the equalizing device is to be operatively connected. Fig. 8 is a side elevation of another form of bracket or support to be used with my invention. Fig. 9 is a longitudinal vertical section of one of the car-trucks and a portion of a car-body, said view also representing one arrangement of the brake-rigging for actuating the brake-shoes.

Similar letters of reference are employed in all of the said above-described views to indicate corresponding parts.

In Fig. 1 of the drawings I have illustrated one form of double car-truck, which may be of any desirable construction and in which the trucks are respectively indicated by the reference-letters A and A'. In these forms of trucks, as will be seen more especially from an inspection of Fig. 9, $a$ indicates the brake-beams, to which are secured in the usual manner the brake-shoes $a'$. These brake-beams are pivotally secured by means of links $a^2$ to the framework $a^5$ of the truck, as illustrated. Slidably arranged upon the said frame-pieces $a^5$ of each truck is a cross-bar $a^4$, to which are attached, by means of clamping or holding pieces $b'$, curved bars $b$. Suitably secured to the longitudinally-extending frame-pieces $a^6$ of each truck is a cross-piece $a^7$, which is provided with bifurcated or forked bearings $a^8$, each provided with a pivotal pin or bolt $a^9$. Arranged upon each pin $a^9$ is a lever $l$. These levers have pivotally connected therewith at their lower end portions, by means of pins or bolts $l'$, suitable connecting-rods $l^2$. These rods $l^2$ are connected at their forward ends with the brake-beams $a$ at the inner end portion of the truck. In like manner there are pivotally connected with each lever $l$, by means of suitable pins or bolts $l^3$, a second pair of connecting-rods $l^4$, which have their opposite ends attached to the brake-beam $a$ at the opposite end portion of the truck. Suitably secured to the cross-bar $a^4$ are pull-rods $l^6$, which are pivotally connected with the upper ends of the levers $l$ by means of the pins or bolts $l^5$. Thus when there is a pull upon the curved bars $b$ in the direction of the arrows 2, (shown in Figs. 1 and 9,) in the manner hereinafter fully set forth, then the brake-shoes will be moved toward and against the car-wheels in the directions indicated by the arrows 3.

The preferred construction of equalizing device to be used with said brake mechanism for actuating the brake-shoes just described or to be employed with any other desirable construction of brake-shoe-operating mechanism is illustrated more particularly in Figs. 1, 3, 4, 5, and 6 of the drawings. Said device consists, essentially, of a suitably-constructed bracket or support $c$, which is secured by means of bolts or in any other well-known manner to the bottom of the body of a car in a position centrally between said trucks A and A'. Said bracket or support $c$ has a portion $c'$ provided on its under side with a downwardly-extending bearing portion $c^2$, formed integral with said part $c'$, as illustrated more particularly in Figs. 6 and 7, or secured thereto by means of bolts $k$, as indicated in Fig. 8 of the drawings. As illustrated, the said bearing portion $c'$ is provided with a suitable hole or perforation $c^3$, which is in alinement with a hole or perforation $c^4$ in the portion $c'$ directly above said part $c^2$.

On suitable short pins or bolts $d$ and $d'$, arranged, respectively, in the holes or perforations $c^4$ and $c^3$ of the portions $c'$ and $c^2$ of the bracket or support $c$, I have pivotally arranged a cross-bar $e$, which extends on opposite sides of said bracket, as clearly illustrated in the several figures of the drawings. The said bar $e$ is provided with a centrally-arranged link-shaped portion $e'$, formed by the parts $e^3$ of said bar $e$, which terminate in single arms $e^4$ and $e^5$, as indicated more especially in Fig. 5. The said portions $e^3$ are each provided with a centrally-arranged hole, in which the bolts or pins $d$ and $d'$, connected with the support or bracket $c$, are arranged and secured in position and whereby said link portion $e'$ of the bar $e$ is pivotally arranged between the inner surfaces of the part $c'$ and the said bearing portion $c^2$ and can oscillate on said bearing portion, as will be clearly evident and for the purposes hereinafter more fully set forth. At or near the end of each arm $e^4$ and $e^5$ the said arms are provided with one or more holes $e^6$, with which are pivotally and adjustably connected, by means of suitable bolts or pins $g$ or in any well-known manner, the ends $f^2$ of the connecting-rods $f$ and $f'$, which are to be actuated by the motorman when putting on the brakes.

Upon suitable pins $e^7$, which can be adjustably arranged in suitably-placed holes $e^{10}$ in the said link portion $e'$, are certain wheels $e^8$ and $e^9$, which are preferably grooved, as shown. Passing in opposite directions over the peripheral surfaces of said wheels is a flexible connection $h$, such as a chain, which has its ends operatively connected with the loops or eyes $i^2$ of certain rods $i$ and $i'$. These rods $i$ and $i'$, as will be seen from an inspection of Fig. 1, have their opposite ends $i^3$ pivotally connected, by means of pins or bolts $i^4$, with an auxiliary cross-bar $i^5$, to which is secured at the middle of the bar a longitudinally-extending rod $i^6$, having a bifurcated end $i^7$ and wheel $i^8$, which embrace the curved bars $b$ of the brake-rigging in the usual manner and as clearly indicated in said Fig. 1 of the drawings. The oppositely-extending arm portions $i^9$ of the auxiliary bars $i^5$, which are connected with the curved bars $b$ of the respective trucks in the manner just described, have arranged upon pins or bolts $i^{11}$ the bifurcated end portions $i^{10}$ of a link $i^{12}$, which has sufficient sag, so that when the several parts of the device are operatively connected the central portion of said link $i^{12}$ will become arranged beneath the bearing portion $c^2$ of the support or bracket $c$ without interfering with the operativeness and usefulness of the whole mechanism. If desired, I may dispense with the said auxiliary cross-bars $i^5$ and the connecting rods or links $i^6$ and connect the bifurcated ends of the respective rods $i$ and $i'$ and the wheel $i^8$ in said ends directly to the curved bars $b$ of the brake-rigging, as clearly indicated in Fig. 3. As clearly represented in said Figs. 1, 3, 4, and 5, in both constructions, I prefer to use the flexible connections $h$ between the ends $i^2$ of the respective rods $i$ and $i'$, the said flexible connections passing over the wheels $e^8$ and $e^9$, which can be placed nearer to each other or farther apart by changing the positions of the pins or bolts $e^7$ in the holes $e^{10}$, whereby any slack in the chain $h$ can be quickly taken up and a rigid connection can be maintained between the wheels $i^8$ and the respective bars $b$, with which said wheels are operatively connected, as will be clearly understood.

In Fig. 2 I have illustrated still another slightly-modified form of construction which, however, still embodies the leading features of my present invention. In this construction I have dispensed with the use of the flexible connection $h$ and the wheels $e^8$ and $e^9$, and in place of the two connecting-rods $i$ and $i'$ I employ other rods $i^{13}$. These rods are provided with the bifurcated end portions $i^{14}$ and are secured by means of the pins or bolts $i^{15}$ to the auxiliary cross-rods $i^5$, in the manner of the rods $i$ and $i'$ described in connection with the arrangement of parts represented in Fig. 1. The opposite ends of the said rods $i^{13}$ are likewise provided with bifurcated end portions $i^{16}$ and can be adjustably connected by means of pins or bolts $i^{17}$, which are arranged in the holes $e^{10}$ with the cross-rod $e$, as will be clearly understood from an inspection of said Fig. 2.

The workings and the operations of the several parts of the mechanism just described are exceedingly simple and are substantially as follows: When the operator on the platform at either end of the body of the car operates the brake-lever, either of the connecting-rods $f$ or $f'$ will cause an oscillatory movement of the cross-bar $e$ in its bracket or support $c$, whereby a direct pull is exerted by both arms $e^4$ and $e^5$ of the said bar $e$ by means of the flexible connection upon both rods $i$ and $i'$ or by means of the bars or rods $i^{13}$, which are directly pivoted to the cross-bar $e$ through the intermediately-arranged bars or rods upon the curved bars $b$ of the brake-rigging. In consequence thereof the brake-beams $a$ of each truck become actuated and bring the several brake-shoes $a'$ into operative gripping engagement with the peripheral surfaces of the several wheels of the trucks. From an inspection of the drawings it will be seen that the movements of the rods $f$ and $f'$ are in the directions of the arrows 1 and the movement of the rods comprising the mechanism for operating the curved rods $b$ are in the direction of the arrows 2, while the movements of the brake-shoes are in the direction of the arrows 3.

From the above description it will be seen that no matter whether the bar $e$ is actuated by the pull-rod $f$ by the pull-rod $f'$ the flexible connection $h$ between the rods $i$ and $i'$ or the pivotal connection between the rods $i^{13}$ and the said bar $e$ and the variously-connected parts between the two bars $b$ such parts of the mechanism will accommodate themselves to the relative positions of the several brake-shoes and the mechanism will act as an equalizing device to cause all the brake-shoes to bear simultaneously and with great power against the surfaces of the respective wheels and will properly brake with the same. Furthermore, the arrangement of the two pins or bolts $d$ and $d'$, on which the link portion $e'$ of the bar $e$ is arranged, is very essential to permit the flexible connection $h$ to pass diagonally across the central part of the link portion; otherwise there would be distortion and unnecessary frictional wear, which would soon render the mechanism inoperative and useless. Thus it will be clearly evident that each brake-shoe, irrespective of the wear upon its braking surface, will automatically adjust itself in relation to the surface of the wheel with which it is to be brought in braking engagement.

I am fully aware that changes may be made in the several arrangements and combinations of the several parts, as well as in the details of the construction thereof, without departing from the scope of my invention. Hence I do not limit my invention to the exact arrangements and combinations of the parts as herein shown and described, nor do I confine myself to the exact details of the construction thereof.

My invention is applicable to trucks of the various classes for electric, cable, or railway cars of the various constructions and is capable of application to a single truck as well as a double truck.

Having thus described my invention, what I claim is—

1. In a brake mechanism for wheeled trucks, the combination, with movable brake-beams and their brake-shoes, and the brake-rigging, of an equalizing device, consisting, essentially, of an oscillatory cross-bar, connecting-rods connected therewith to be operated from the brake-lever on a platform of a car-body, and a connection operatively connected with said oscillatory cross-bar and said brake-beams, comprising a pair of rods connected at one end with said oscillatory cross-bar, auxiliary cross-bars with which the opposite ends of said rods are pivotally connected, an intermediate connecting link or rod between said auxiliary cross-bars, and a curved bar between each auxiliary cross-bar and the movable brake-beam, substantially as and for the purposes set forth.

2. In a brake mechanism for wheeled trucks, the combination, with movable brake-beams and their brake-shoes, and the brake-rigging, of an equalizing device, consisting, essentially, of an oscillatory cross-bar, connecting-rods connected therewith to be operated from the brake-lever on a platform of a car-body, a flexible connection slidably and operatively connected with said oscillatory cross-bar, and a set of connecting-rods between the ends of said flexible connection and said brake-beams, comprising, a pair of rods connected at their inner ends to said flexible connection, auxiliary cross-bars with which the opposite ends of said rods are pivotally connected, an intermediate connecting link or rod connecting said auxiliary cross-bars, and a curved bar between each auxiliary cross-bar and the movable brake-beam, substantially as and for the purposes set forth.

3. In a brake mechanism for wheeled trucks, the combination, with movable brake-beams and their brake-shoes, and the curved bars $b$ of the brake-rigging, of a bracket or support $c$, and a bearing portion $c^2$, provided with perforations or holes $c^3$ and $c^4$, a short pin $d'$ in said hole $c^3$, a short pin $d$ in said hole $c^4$, an oscillatory cross-bar, a centrally-arranged link portion on said bar, pivoted on said pins so as to oscillate in said bearing portion, a pair of wheels in said link portion, connecting-rods connected with said oscillatory bar, to be operated from a brake-lever on a platform of the car-body, and a flexible connection slidably but operatively arranged between said oscillatory bar and said brake-beams, said connection being movable diagonally across the central part of said link portion, and being slidably connected with said curved bars $b$, substantially as and for the purposes set forth.

4. In a brake mechanism for wheeled trucks, the combination, with movable brake-beams and their brake-shoes, and the curved bars $b$ of the brake-rigging, of a bracket or support $c$, having a bearing portion $c^2$, provided with perforations or holes $c^3$ and $c^4$, a short pin $d'$ in said hole $c^3$, a short pin $d$ in said hole $c^4$, an oscillatory cross-bar, a centrally-arranged link portion on said bar, pivoted on said pins so as to oscillate in said bearing portion, a pair of wheels in said link portion, connecting-rods connected with said oscillatory bar, to be operated from a brake-lever on a platform of the car-body, and a flexible connection slidably but operatively connected with said oscillatory bar and connecting-rods having their inner ends connected with the ends of said flexible connection, for actuating said brake-beams, said flexible connection being movable diagonally across the central part of said link portion, and said connecting-rods having their opposite ends slidably connected with said curved bars $b$, substantially as and for the purposes set forth.

5. The herein-described equalizing device for a brake mechanism, comprising the curved bars $b$ of the brake-rigging, a bracket or support, having a pair of oppositely-placed holes or perforations, a short pin in each hole or perforation, and an oscillatory cross-bar $e$ pivoted upon said pins in said bracket or support, having a link portion $e'$, a pair of wheels in said link portion, a flexible connection passing over and around said wheels, and means connected with said flexible connection and the said curved bars $b$ for actuating a brake-shoe rigging, substantially as and for the purposes set forth.

6. The herein-described equalizing device for a brake mechanism, comprising the curved bars $b$ of the brake-rigging, a bracket or support $c$ having a portion $c'$ provided with a perforation or hole $c^4$, and a bearing portion $c^2$, having a perforation or hole $c^3$, a short pin $d$ in said perforation or hole $c^4$, a short pin $d'$ in said hole or perforation $c^3$, an oscillatory bar $e$ pivotally arranged on said pins in said bearing portion, said bar $e$ comprising a link portion $e'$ and oppositely-extending and perforated arms $e^4$ and $e^5$, a pair of wheels in said link portion, a flexible connection passing over and around said wheels, and means connected with said flexible connection and the said curved bars $b$ for actuating a brake-shoe rigging, substantially as and for the purposes set forth.

In testimony that I claim the invention set forth above I have hereunto set my hand this 31st day of May, 1900.

MICHAEL Q. RUTAN.

Witnesses:
FREDK. C. FRAENTZEL,
GEO. D. RICHARDS.